United States Patent [19]

Kawada et al.

[11] Patent Number: 4,482,854
[45] Date of Patent: Nov. 13, 1984

[54] INVERTER CIRCUIT

[75] Inventors: Shigeki Kawada, Hino; Hiroshi Ishida, Hamura; Shinichi Kouno, Hino, all of Japan

[73] Assignee: Fanuc Ltd., Tokyo, Japan

[21] Appl. No.: 433,103

[22] Filed: Oct. 6, 1982

[30] Foreign Application Priority Data

Oct. 9, 1981 [JP] Japan .................................. 56-161239

[51] Int. Cl.³ ........................................... H02H 7/122
[52] U.S. Cl. ...................................... 318/801; 363/58; 361/56
[58] Field of Search ........................... 361/56, 91, 111; 363/37, 56–58, 47; 318/801, 782, 805

[56] References Cited

U.S. PATENT DOCUMENTS

| 3,047,746 | 7/1962 | Berkery | 361/111 X |
| 3,793,535 | 2/1974 | Chowdhuri | 361/111 |
| 4,095,163 | 6/1978 | Montague | 361/91 X |
| 4,307,442 | 12/1981 | Yano | 363/37 X |
| 4,327,405 | 4/1982 | Clark, Jr. | 363/56 |

OTHER PUBLICATIONS

Soviet Inventions Illustrated, Week C42, Nov. 26, 1980, Section U 24 & SU-A-718876.
AT-B-224 738, (International Standard Electric Corp.), p. 1, lines 21-24.

Primary Examiner—J. V. Truhe
Assistant Examiner—Patrick Keane
Attorney, Agent, or Firm—Staas & Halsey

[57] ABSTRACT

An inverter circuit having a bridge circuit comprising a plurality of switching elements connected in the form of a bridge for converting, into alternating current, a DC voltage produced by a DC voltage generating unit and which is received through a first switching circuit. The inverter circuit includes a pair of diodes and a spike absorbing capacitor which constitute a series network wherein the diodes are connected so as to be forward biased with respect to the DC voltage and the spike absorbing capacitor is connected between the diodes. The series network is connected in parallel with the bridge circuit and is connected to the DC voltage generating unit through the first switching circuit. The spike absorbing capacitor is connected in parallel with a smoothing capacitor of the DC voltage generating unit.

5 Claims, 1 Drawing Figure

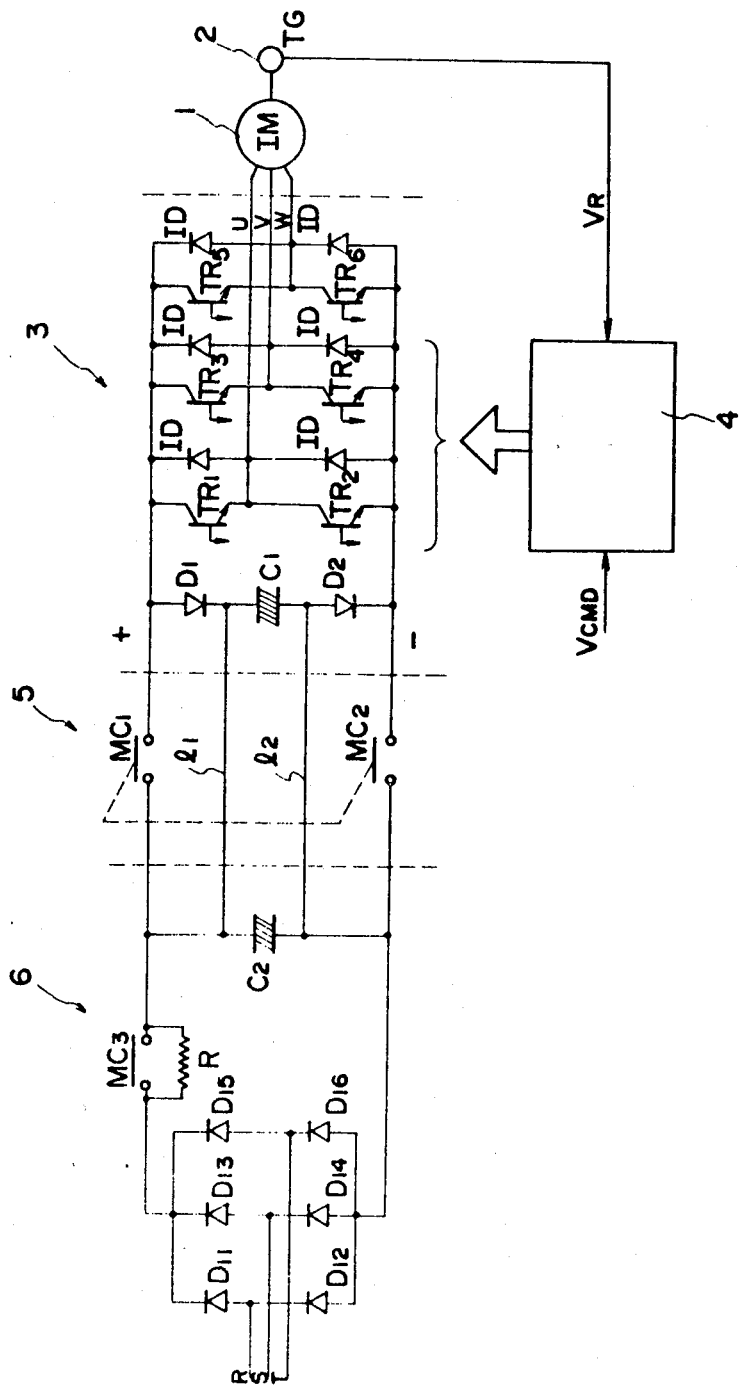

INVERTER CIRCUIT

BACKGROUND OF THE INVENTION

This invention relates to an inverter circuit, particularly to improvements in an inverter circuit for driving a AC motor.

It has become possible to control the speed of recently developed AC motors by varying the frequency of an alternating current delivered to the motor, from the output side of an inverter. The type of inverter involved comprises switching elements such as a plurality of transistors or thyristors connected in the form of a bridge, and converts a direct current applied to its input side into an alternating current due to the switching action of the switching elements. In turning on and off, the switching elements in the inverter produce sharp electrical spikes which are a source of noise and which may even damage the elements of the inverter. To prevent such phenomena, a so-called snubber circuit comprising a capacitor, resistor and diode in parallel is connected across both ends of each switching element so that the spikes produced by the switching elements may be absorbed within the snubber circuit. Such an arrangement is disadvantageous because, providing each switching element with a snubber circuit complicates the overall circuitry. An improvement has been to employ circuitry wherein a capacitor of large capacitance is connected to the inverter input circuit for the purpose of absorbing spikes produced by the inverter.

In a case where the improved inverter arrangement is used to drive an AC spindle motor of a machine tool, safety requires that the DC voltage applied to the inverter be cut off when the machine is not in use. To this end, a contactor must be provided on the inverter input side. When the contactor is closed (i.e., switched "on") to use the machine tool, a large momentary current flows into the spike absorbing capacitor from the source of direct current, requiring that the source, such as a rectifying circuit, be large enough in size to withstand the large momentary current. This is a requirement that, because of cost, results in poor economy. Another shortcoming is that each time the machine tool is actuated, a large rush current flows into the spike absorbing capacitor, thereby shortening its life.

SUMMARY OF THE INVENTION

Accordingly, an object of the present invention is to provide an inverter circuit wherein it is possible to absorb the spikes that are produced during the on/off switching action of the inverter switching elements such as transistors or thyristors.

Another object of the present invention is to provide an inverter circuit designed so that a large rush current will not flow into a spike absorbing capacitor or into the diodes constituting a rectifying circuit whenever a DC voltage is impressed upon the inverter by the action of a contactor.

Still another object of the present invention is to provide an inverter circuit in which it is unnecessary to employ diodes of large size in constructing a rectifying circuit.

Yet another object of the present invention is to provide an inverter circuit which, through a simple circuit arrangment, makes it possible to absorb spikes without causing large rush currents to flow.

According to the present invention, these and other objects are attained by providing an improved inverter circuit having diodes connected across the input terminals to an inverter in such fashion so as to be forward biased with respect to a source of direct current, and a spike absorbing capacitor inserted between the diodes and connected in series therewith. During the operation of the inverter, spike pulses produced by the inverter switching elements are completely absorbed by the capacitor through the diodes. The spike absorbing capacitor is constantly charged by connection to a source of DC current so that large rush currents do not flow into the capacitor whenever a voltage is impressed upon the inverter.

Other features and advantages of the invention will be apparent from the following description in connection with the accompanying drawing.

BRIEF DESCRIPTION OF THE DRAWING

The sole FIGURE is a circuit diagram illustrating a device for controlling the operation, specifically the speed, of an AC motor in accordance with the present invention.

DESCRIPTION OF THE PREFERRED EMBODIMENT

The FIGURE illustrates an operation control device for controlling the speed of an AC motor, specifically a three-phase induction motor, through use of an inverter. Numeral 1 denotes a three-phase induction motor, the rotational speed thereof is sensed by a tachogenerator 2. The induction motor 1 is driven by an inverter 3, including six bridge-connected transistors TR1 through TR6. The induction motor 1 is connected to the output of the inverter 3 as a load. The inverter 3 also includes freewheel diodes ID. A diode D1, a spike absorbing capacitor C1 and a diode D2 are serially connected, in the order mentioned, across the DC input terminals of the inverter 3. It should be noted that the diodes D1 and D2 are forward biased with respect to the source of direct current. Since the capacitor C1 is furnished for the purpose of absorbing spikes, it is essential that the capacitor be provided as close as possible to the bridge circuit made up of the transistors TR1 through TR6. A speed control circuit 4 is provided and, though not shown, includes circuitry for controlling the switching of the inverter transistors TR1 through TR6 in accordance with a deviation between a commanded speed and the actual speed of the motor 1. Specifically, the speed control circuit 4 controls the switching of the transistors TR1 through TR6 on the basis of an externally applied speed command signal VCMD, whereby the inverter 3 produces a three-phase alternating current of a prescribed effective voltage and frequency, which is impressed upon the three-phase induction motor 1 to rotate the motor. As the motor rotates, the tachogenerator 2 generates a voltage VR which conforms to the actual rotational speed of the motor. Thenceforth the speed control circuit 4 controls the on/off switching action of the transistors TR1 through TR6 so as to bring the actual motor speed into agreement with the commanded speed. An example of the speed control circuit 4 is disclosed in the specification of U.S. Pat. No. 4,327,315.

Numeral 5 denotes a contactor portion having two contactors MC1 and MC2 opened or closed simultaneously for cutting off the DC voltage from or applying it to the inverter 3. A rectifying circuit 6, having a bridge circuit comprising six diodes D11 through D16, has its input side connected to three-phase AC power R, S, T. Connected to the output side of the rectifier bridge circuit is a contactor MC3, which is in turn connected in parallel with a resistor R. Connected across the output side of the rectifier bridge, at a point closer to the connector portion 5 than to the connector MC3, is a smoothing capacitor C2 which is connected in parallel with the capacitor C1 via lines $l_1$, $l_2$.

In discussing the operation of the present invention, we shall assume that the three-phase induction motor 1 is being employed as the spindle motor of a machine tool. When power is applied to the various circuit elements of the machine tool, three-phase alternating current from the three-phase AC source R, S, T flows into the rectifier bridge circuit 6, which produces a DC voltage that appears at its output side. Since the contactor MC3 will initially be open, the direct current slowly charges the capacitors C1, C2 through the resistor R. The time T required to fully charge the capacitors C1, C2 is expressed by the formula $T=(C1+C2)R$, as is well-known. Due to the resistor R, the charging current cannot be large enough in magnitude to damage the diodes D11 through D16. Contactor MC3 is closed when the capacitors C1 and C2 become fully charged. When this occurs, the three-phase induction motor 1 is ready to operate.

To operate the motor 1, the first step is to provide the speed control circuit 4 with a speed command signal VCMD of the desired analog value, so that the inverter 3 control circuit 4 may produce control signals for controlling the transistors TR1 through TR6 that constitute the inverter 3. Following this and the contactors MC1, MC2 are closed simultaneously. This applies the direct current from the rectifying circuit 6 to the inverter 3, but since the capacitor C1 is already charged, no rush current flows into the capacitor C1 through the diodes D1 and D2. Upon receiving the direct current, the inverter 3 produces three-phase alternating current of a predetermined frequency at its outputs U, V, W, the current being applied to the three-phase induction motor 1 to drive the motor into rotation. The rotational speed of the motor is sensed by the tachogenerator 2 and which responds by applying the voltage VR, indicative of actual rotational speed, to the speed control circuit 4. The latter responds by regulating the control signals applied to the inverter 3 in such a manner that the rotational speed of the motor 1 is made to approach the rotational speed specified by the speed command signal VCMD. Since electrical spike pulses generated when the transistors TR1 through TR6 turn on or off are absorbed by the capacitor C1 through the diodes D1 and D2, the spikes do not leak out toward the three-phase AC power source R, S, T through the contactor portion 5 and rectifying circuit 6.

When the induction motor 1 is to be stopped, for example to change tools, the first step is to set the speed command signal VCMD to zero so that the speed control circuit 4 will issue control signals to decelerate and stop the motor. Contactors MC1 and MC2 of the contactor portion 5 are opened after the motor 1 stops. Note that capacitor C1 still receives voltage from the rectifying circuit 6, and therefore remains charged, even when the contactor portion 5 is opened. Since the diodes D1 and D2 are reverse biased the inverter 3 is isolated from the rectifying circuit 6.

Next, to rotate the induction motor 1 at a low speed and to bring the spindle to rest at a predetermined orientation, the contactors MC1, MC2 of the contactor portion 5 are closed so that the rectifying circuit 6 may supply the inverter 3 with power. Again, a rush current will not flow since capacitor C1 is already charged.

While it is preferred that the voltage to which the capacitor is charged C1 be approximately equivalent to the DC voltage impressed upon the inverter 3, a somewhat lower voltage is sufficient. It also does not matter whether the capacitor C1 is charged by the rectifying circuit 6, as in the preferred embodiment, or by another suitably arranged circuit.

In accordance with the present invention as described and illustrated hereinabove, the diodes D1 and D2 are connected across the input terminals of the inverter 3 in such fashion so as to be forward biased with respect to the power source. The spike absorbing capacitor C1 is inserted between the diodes D1 and D2 and connected in series therewith. During the operation of the inverter 3, therefore, spike pulses produced by the inverter switching elements, namely the transistors TR1 through TR6, are completely absorbed by the capacitor C1 through the diodes D1 and D2. Another advantage of the invention is that since the spike absorbing capacitor C1 is constantly charged by connection to a source of direct current, such as the rectifying circuit 6, large rush currents do not flow into the capacitor whenever a voltage is impressed upon the inverter 3. This removes the necessity of employing large-size diodes in the rectifying circuit in order to withstand large rush currents.

As many apparently widely different embodiments of the present invention may be made without departing from the spirit and scope thereof, it is to be understood that the invention is not limited to the specific embodiments discussed but, is defined by the appended claims.

What we claim is:

1. An inverter circuit connectable to a DC voltage generating unit having output terminals, and to a bridge circuit, having input terminals and a plurality of switching elements connected in the form of a bridge, for receiving a DC voltage from said DC voltage generating unit and for converting into an alternating current, The received DC voltage, said inverter circuit comprising:

first switching means for connecting said bridge circuit input terminals to said DC voltage generating circuit output terminals when said first switching means is closed to begin operation of said inverter circuit;

a series network including
   a pair of diodes connected so as to be forward biased with respect to the DC voltage, and
   a spike absorbing capacitor connected between said diodes, said series network being connected to the input terminals of said bridge circuit, said spike absorbing capacitor having both ends thereof connected, for DC current, to the output terminals of said DC voltage generating unit prior to closure of said first switching means.

2. An inverter circuit according to claim 1, wherein said DC voltage generating unit further includes an AC power source, a rectifier for rectifying an AC signal from the AC power source into direct current, a smoothing capacitor connected to said recitifier for smoothing the direct current output of said rectifier, and a parallel circuit comprising
   a resistor, and
   a second switching means interposed between said rectifier and said smoothing capacitor for connecting said rectifier to said smoothing capacitor upon a lapse of a prescribed time period following application of power from said AC source to said rectifier.

3. An inverter circuit according to claim 2, wherein the AC power is impressed upon said rectifier and each of said capacitors is charged by the direct current output of said rectifier, when said second switching means of said parallel circuit and said first switching means are in the open state.

4. An inverter circuit according to claim 3, in which after each of said capacitors is charged, said second switching means is closed followed by closure of said first switching means.

5. An inverter circuit according to claim 2, wherein said first switching means closes after said second switching means closes.

* * * * *

UNITED STATES PATENT AND TRADEMARK OFFICE
CERTIFICATE OF CORRECTION

PATENT NO. : 4,482,854

DATED : November 13, 1984

INVENTOR(S) : Kawada et al.

It is certified that error appears in the above-identified patent and that said Letters Patent is hereby corrected as shown below:

Front page, [73] Assignee: "Ltd." should be --Ltd--.
Column 3, line 8, "$l_1$, $l_2$" should be --$\ell_1$, $\ell_2$--.

Column 4, line 48, "including" should be --including-- --;
line 65, "comprising" should be --comprising-- --.

Signed and Sealed this

Thirtieth Day of April 1985

[SEAL]

Attest:

DONALD J. QUIGG

*Attesting Officer*  *Acting Commissioner of Patents and Trademarks*